(12) United States Patent
Koo

(10) Patent No.: US 11,746,687 B2
(45) Date of Patent: Sep. 5, 2023

(54) EHC LINE LEAKAGE DIAGNOSIS METHOD AND VEHICLE EXHAUST SYSTEM THEREOF

(71) Applicants: Hyundai Motor Company, Seoul (KR); Kia Corporation, Seoul (KR)

(72) Inventor: Bon-Chang Koo, Seongnam-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/847,669

(22) Filed: Jun. 23, 2022

(65) Prior Publication Data

US 2023/0203978 A1  Jun. 29, 2023

(30) Foreign Application Priority Data

Dec. 27, 2021 (KR) .......................... 10-2021-0187968

(51) Int. Cl.
*F01N 11/00* (2006.01)
*F01N 3/20* (2006.01)
(Continued)

(52) U.S. Cl.
CPC ............ *F01N 11/002* (2013.01); *F01N 3/101* (2013.01); *F01N 3/2013* (2013.01); *F01N 3/323* (2013.01); *F01N 11/007* (2013.01); *F01N 1/14* (2013.01); *F01N 3/05* (2013.01); *F01N 3/2006* (2013.01); *F01N 3/2026* (2013.01); *F01N 3/22* (2013.01); *F01N 3/225* (2013.01); *F01N 2240/04* (2013.01); *F01N 2240/16* (2013.01); *F01N 2550/02* (2013.01); *F01N 2550/14* (2013.01);
(Continued)

(58) Field of Classification Search
CPC combination set(s) only.
See application file for complete search history.

(56) References Cited

U.S. PATENT DOCUMENTS 5,746,053 A * 5/1998 Hibino .................. F01N 3/2013
                                                          219/202
5,782,086 A    7/1998 Kato et al.
(Continued)

FOREIGN PATENT DOCUMENTS

JP     1992-308312 A     10/1992
JP     1996-246851 A      9/1996
(Continued)

*Primary Examiner* — Binh Q Tran
(74) *Attorney, Agent, or Firm* — MORGAN, LEWIS & BOCKIUS LLP

(57) ABSTRACT

An EHC line leakage diagnosis method can operate a heater of an oxygen detector when satisfying one or more conditions of an engine off time, a coolant temperature, and an outside air temperature by a diagnosis controller upon the key-on of the non-operation of an engine, and then, determine the normality or abnormality of a temperature drop using a change in a temperature value of a signal value and the temperature value detected by the oxygen detector after an air pump is driven, and then confirm the leakage of an exhaust line and a line on the rear end portion of an EHC valve of an air line using the number of times of the occurrence of the abnormality of the temperature drop, and can perform the failure diagnosis without generating the exhaust gas by not operating an engine.

20 Claims, 8 Drawing Sheets

(51) Int. Cl.
  *F01N 3/10* (2006.01)
  *F01N 3/32* (2006.01)
  *F01N 1/14* (2006.01)
  *F01N 3/22* (2006.01)
  *F01N 3/05* (2006.01)
  *F02D 41/20* (2006.01)
  *F02D 41/14* (2006.01)
  *F02D 41/22* (2006.01)

(52) U.S. Cl.
  CPC ...... *F01N 2550/20* (2013.01); *F01N 2560/20* (2013.01); *F01N 2610/08* (2013.01); *F01N 2610/085* (2013.01); *F01N 2900/0602* (2013.01); *F01N 2900/1804* (2013.01); *F02D 41/1494* (2013.01); *F02D 41/1495* (2013.01); *F02D 41/221* (2013.01); *F02D 41/222* (2013.01); *F02D 2041/2086* (2013.01); *F02D 2041/2093* (2013.01)

(56) References Cited

U.S. PATENT DOCUMENTS

| | | |
|---|---|---|
| 5,852,929 A | 12/1998 | Kato et al. |
| 9,097,165 B2 | 8/2015 | Kim |
| 10,301,991 B1* | 5/2019 | Dudar ................ F02M 35/1038 |
| 11,286,825 B2* | 3/2022 | Korenaga ............. F01N 3/2006 |
| 2005/0034449 A1* | 2/2005 | Frieden ................ F01N 3/2006 60/284 |
| 2009/0056313 A1* | 3/2009 | Kama ................ F02D 41/1495 60/277 |
| 2014/0352283 A1* | 12/2014 | Kumagai ............. F01N 3/2026 60/286 |
| 2015/0218995 A1* | 8/2015 | Hashimoto ........... F01N 3/2013 60/286 |
| 2018/0094556 A1* | 4/2018 | Kurtz ..................... F01N 3/027 |

FOREIGN PATENT DOCUMENTS

| | | |
|---|---|---|
| JP | 1997-021313 A | 1/1997 |
| JP | 1998-047130 A | 2/1998 |
| JP | 2005-002958 A | 1/2005 |
| KR | 10-1393532 B1 | 5/2014 |

\* cited by examiner

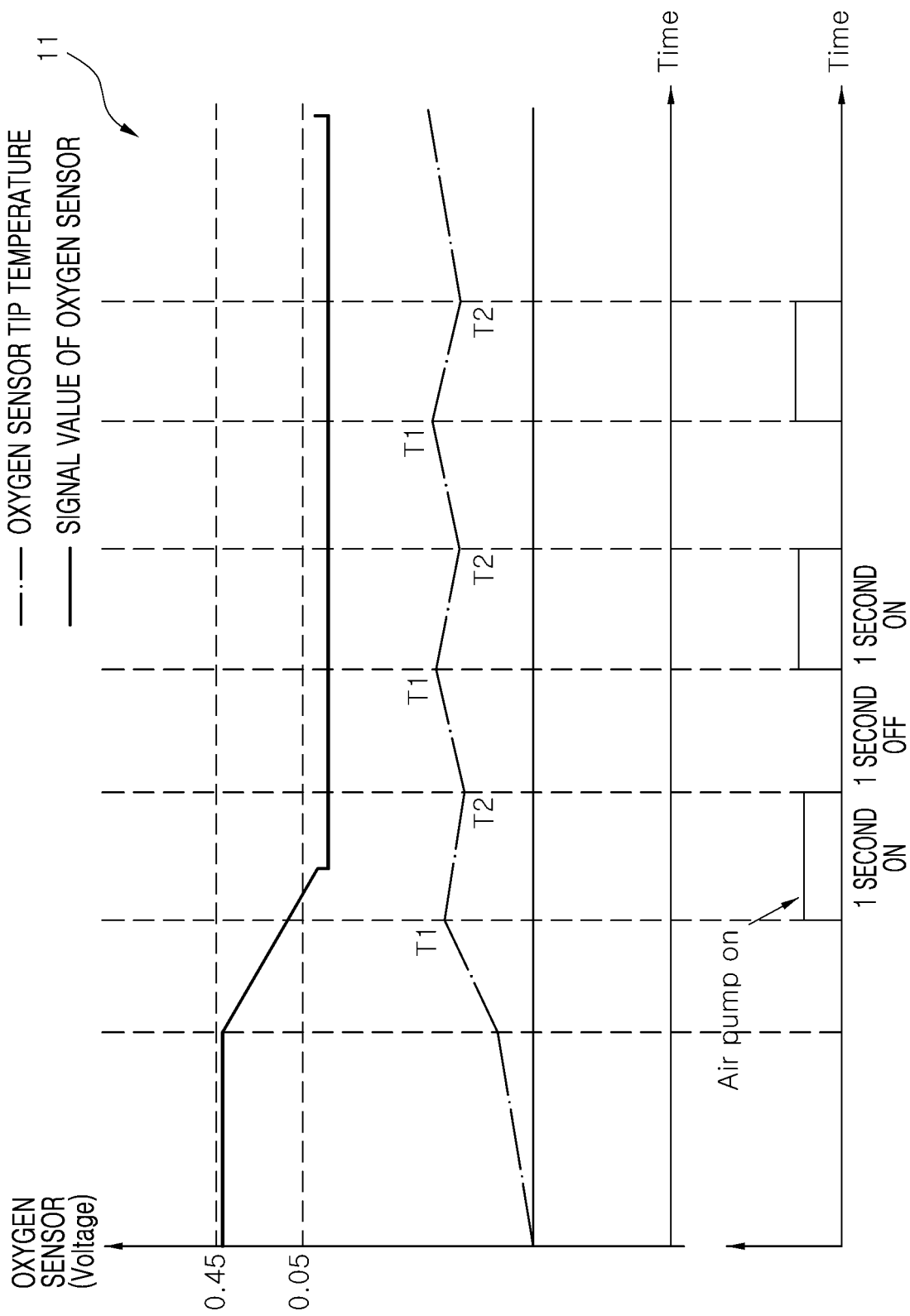

EHC LINE LEAKAGE DIAGNOSIS METHOD AND VEHICLE EXHAUST SYSTEM THEREOF

CROSS-REFERENCE TO RELATED APPLICATION

The present application claims priority to Korean Patent Application No. 10-2021-0187968, filed on Dec. 27, 2021, the entire contents of which is incorporated herein for all purposes by this reference.

BACKGROUND OF THE PRESENT DISCLOSURE

Field of the Present Disclosure

The present disclosure relates to an EHC line leakage diagnosis, and in particular, to a vehicle exhaust system to which an EHC system in which a line leakage on the rear end portion of an EHC valve is diagnosed by use of a temperature value of an oxygen detector that confirms temporary driving results of a heating device and an air pump under conditions of satisfying a coolant temperature and an outside air temperature is applied.

Description of Related Art

In general, an electric heated catalyst (EHC) system applied to a vehicle has a different type of catalyst and EHC embedded in a housing, and sprays air from the upstream of the catalyst into an exhaust line (i.e., exhaust pipe) together with the heating of the catalyst due to the heat generated by supplying a power source.

For example, the EHC system includes an air pump configured to circulate air, a switching valve configured to open a passage of an air line connected to the exhaust line, and a heater as a heating device configured to generate heat by supplying a power source, and is connected to the exhaust line of an exhaust system. In the instant case, the heater is applied in a corresponding configuration necessary to respond to the Euro 7 strengthened exhaust regulations.

Because the EHC system is connected to the exhaust system, it is necessary to diagnose the line leakage on the rear end portion of the valve for the exhaust line and a connection portion, which is required by the Euro 7 strengthened exhaust regulations and therefore, is a function which may be necessarily implemented.

To the present end, a pressure detector type line leakage diagnosis is performed.

For example, the pressure detector includes a pressure detector for valve upstream configured to measure a relative pressure (e.g., 0.5 to 1 bar) between the air pump and the switching valve on a front end portion of the switching valve provided on an air line, and a pressure detector for valve downstream configured to measure an absolute pressure (e.g., 2 bar) between the switching valve and the EHC on a rear end portion of the switching valve, and the pressure detector for valve downstream is used for failure diagnosis as to whether a line on the rear end portion of the switching valve of the EHC with a heater embedded therein is leaked.

Therefore, the pressure detector type line leakage diagnosis can further add a separate pressure detector in addition to the conventional pressure detector applied to the EHC system, and perform the failure diagnosis as to whether the line on the rear end portion of the switching valve of the EHC system is leaked by use of the pressure detector, securing a control of the exhaust gas and safety and satisfying the Euro 7 strengthened exhaust regulations.

However, the pressure detector type line leakage diagnosis requires at least two pressure detectors, inevitably increasing the number of pressure detectors used in the EHC system.

Above all, the pressure detector type line leakage diagnosis is characterized by being performed in a state where the exhaust gas is discharged from an engine after the engine is operated, which may be adversely influenced by the exposure of high-temperature exhaust gas flowing through the exhaust line in a state where the pressure detector is provided on the exhaust line, inevitably having difficulty in selecting a position where the pressure detector is mounted.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an EHC line leakage diagnosis method and a vehicle exhaust system thereof, which perform a failure diagnosis in a state where an engine is not operated after an starting key-on of a vehicle using an oxygen detector for the clogging or leakage diagnosis of a line on a rear end portion of a valve of an EHC system including a heating device, and confirm the temporary driving results of the heating device and an air pump under conditions of a coolant temperature and an outside air temperature using a signal value and a temperature value of an oxygen detector, securing the accuracy of the failure diagnosis for clogging or leakage and eliminating the difficulty in mounting a pressure detector exposed to a high-temperature exhaust gas.

An EHC line leakage diagnosis method according to an exemplary embodiment of the present disclosure for achieving the object includes: driving a heater of an electric heated catalyst (EHC) system after entry conditions according to an engine state upon key-on of a vehicle are confirmed by a diagnosis controller; detecting a change in temperature using a signal value and a temperature value of an oxygen detector in an exhaust line after an air pump is driven, and confirming an occurrence of a temperature drop according to a time lapse; and confirming a line leakage on a rear end portion of a valve using a number of counts of the occurrence of the temperature drop.

As an exemplary embodiment of the present disclosure, the key-on is an engine non-operation state where an exhaust gas is not generated. The heater is provided in the oxygen detector, and the oxygen detector is provided on the exhaust line.

As the exemplary embodiment of the present disclosure, as the entry conditions, one or more signals of an engine soaking, an outside air temperature, an engine coolant temperature, a throttle detector value, a heater on, and an air pump on are applied.

As the exemplary embodiment of the present disclosure, the driving of the heater for 20 seconds is determined by an engine OFF time of the engine soaking and temperature conditions of the outside air temperature and the engine coolant temperature.

As the exemplary embodiment of the present disclosure, the driving of the air pump includes flowing air into the exhaust line; the signal value of the oxygen sensor confirms a lambda index as a lean state, and the temperature value of the oxygen detector is measured as a first oxygen detector tip temperature and a second oxygen detector tip temperature and applied to the change in the temperature; and the time lapse is a measurement time that confirms a tip temperature difference between the first oxygen detector tip temperature and the second oxygen detector tip temperature, and the occurrence of the temperature drop is confirmed by the tip temperature difference.

As the exemplary embodiment of the present disclosure, the air pump is driven for 1 second, and as the signal value, 0.05 V is applied by setting 0.45 V as a set signal value.

As the exemplary embodiment of the present disclosure, it is determined whether the occurrence of the temperature drop is normal or abnormal according to the tip temperature difference based on 10° C., the tip temperature difference is an absolute value obtained by subtracting the second oxygen detector tip temperature from the first oxygen detector tip temperature, and as the time lapse, 1 second is applied.

As the exemplary embodiment of the present disclosure, when the diagnosis controller confirms that the abnormality of the occurrence of the temperature drop occurs by use of the tip temperature difference, a temperature abnormality counter of the oxygen detector is set as 1 and accordingly, is summed to a number of counters according to occurrence of the abnormality of the occurrence of the temperature drop, the number of counters is a number of times of the air pump driven, and the cumulative number of counters is set as 3 or more than 3.

As the exemplary embodiment of the present disclosure, the line leakage on the rear end portion of the valve is confirmed by the occurrence of the number of times of the occurrence of the temperature drop which is equal to or greater than the number of counts of the temperature abnormality counter set value in a state where a time count set value of the occurrence of the temperature drop is satisfied, and the line leakage on the rear end portion of the valve is confirmed by the number of counts.

As the exemplary embodiment of the present disclosure, the temperature abnormality counter set value is a value in which the temperature drop occurs three times, and the number of temperature abnormality counter set values is the number of times of the air pump 14 driven.

Furthermore, a vehicle exhaust system according to an exemplary embodiment of the present disclosure for achieving the object includes: an exhaust line through which an exhaust gas flows; an electric heated catalyst (EHC) system including an oxygen detector provided on the exhaust line, an air pump configured to transmit air to an air line connected to the exhaust line, a switching valve configured to open a passage of the air line, a pressure detector configured to detect a pressure on a valve front end portion of the switching valve, and an electric heated catalyst (EHC) purifying the exhaust gas; and a diagnosis controller configured to confirm satisfaction of temperature conditions of an engine coolant temperature and an outside air temperature under entry conditions according to a key-on of an engine and accordingly, confirm the occurrence of a temperature drop according to a time lapse depending upon a change in a temperature value of the oxygen detector detected after the airflow of the exhaust line by driving the air pump when the heater of the EHC system is driven, and to confirm a line leakage on a rear end portion of the switching valve using a number of counts of the occurrence of the temperature drop.

The EHC line leakage diagnosis method and the vehicle exhaust system thereof applied to the vehicle exhaust system according to an exemplary embodiment of the present disclosure implement the following operations and effects.

First, it is possible to perform the failure diagnosis in the engine non-operation state after the starting key-on (i.e., key-on) of the vehicle using the oxygen detector for the clogging or leakage diagnosis of the line on the rear end portion of the valve of the EHC system including the heater as the heating device. Second, it is possible to reduce the number of pressure detectors used in the EHC system without using the pressure detector for the failure diagnosis of the EHC line, and to solve the problem of having difficulty in mounting the pressure detector exposed to the high-temperature exhaust gas. Third, the change in detection of the oxygen detector may be based on the large-capacity air pump of the EHC system, performing the leakage diagnosis of the line only by measuring the signal value and temperature value of the oxygen detector. Fourth, it is possible to secure the accuracy of the failure diagnosis for the determination that there is no leakage on the rear end portion of the valve by connecting the drop of the tip portion temperature of the oxygen detector with the lambda index of the lean state (i.e., the oxygen excess state).

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 8 shows an example of characteristics of a signal value and a temperature value of an oxygen detector according to an exemplary embodiment of the present disclosure.

Figure 1:
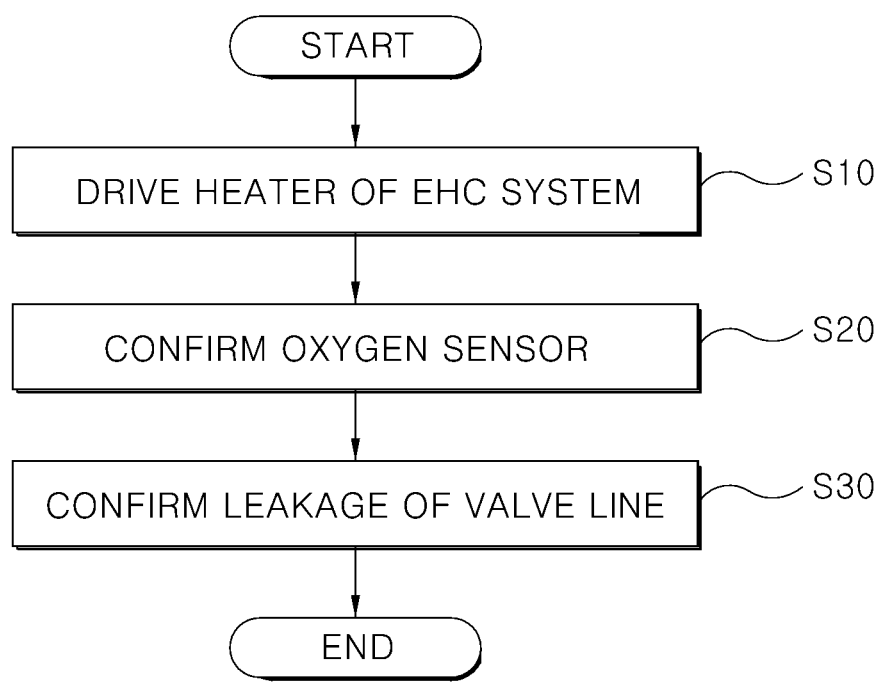
FIG. 1 is a flowchart showing an EHC line leakage diagnosis method according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, an exemplary embodiment of the present disclosure will be described in detail with reference to the accompanying exemplary drawings, and since these exemplary embodiments are examples and can be implemented by those skilled in the art to which the present disclosure pertains in various different forms, they are not limited to the exemplary embodiment described herein.

Referring to FIG. 1, an EHC line leakage diagnosis method drives a heater of an EHC system (S10) and accordingly, confirms an oxygen detector (S20) to confirm the leakage of a valve line on a rear end portion of the valve of the EHC system (S30). In the instant case, a vehicle is in a key-on state of a non-operation state of an engine where fuel is not supplied, and an exhaust line is in a state where the exhaust gas does not flow because the exhaust gas is not generated in the engine.

For example, the driving of the heater of the EHC system (S10) confirms a state where the engine is placed using an engine OFF time and temperatures (e.g., coolant temperature and outside air temperature) before the heater for leakage diagnosis is driven, and therefore, is performed for a certain time.

For example, the confirming of the oxygen detector (S20) can measure a signal value of the oxygen detector and a temperature value of the oxygen detector (e.g., temperature value of a tip portion of the detector) to know the line leakage using the airflow of the air pump driven shortly after the air of the heater is heated.

Therefore, the confirming of the leakage of the valve line (S30) verifies the defect on the rear end portion of the valve of the EHC system with a time count using the signal value/temperature value of the oxygen detector.

As described above, like the line leakage diagnosis of the EHC system using the pressure detector, the EHC line leakage diagnosis method has the characteristics in that the oxygen detector not exposed to the high-temperature exhaust gas by operating the engine that makes it difficult to mount the pressure detector is used, reducing the number of pressure detectors by deleting the pressure detector on the rear end portion of the EHC valve even while easily diagnosing the clogging or leakage of an exhaust line connection portion connected to the EHC system.

Figure 2:
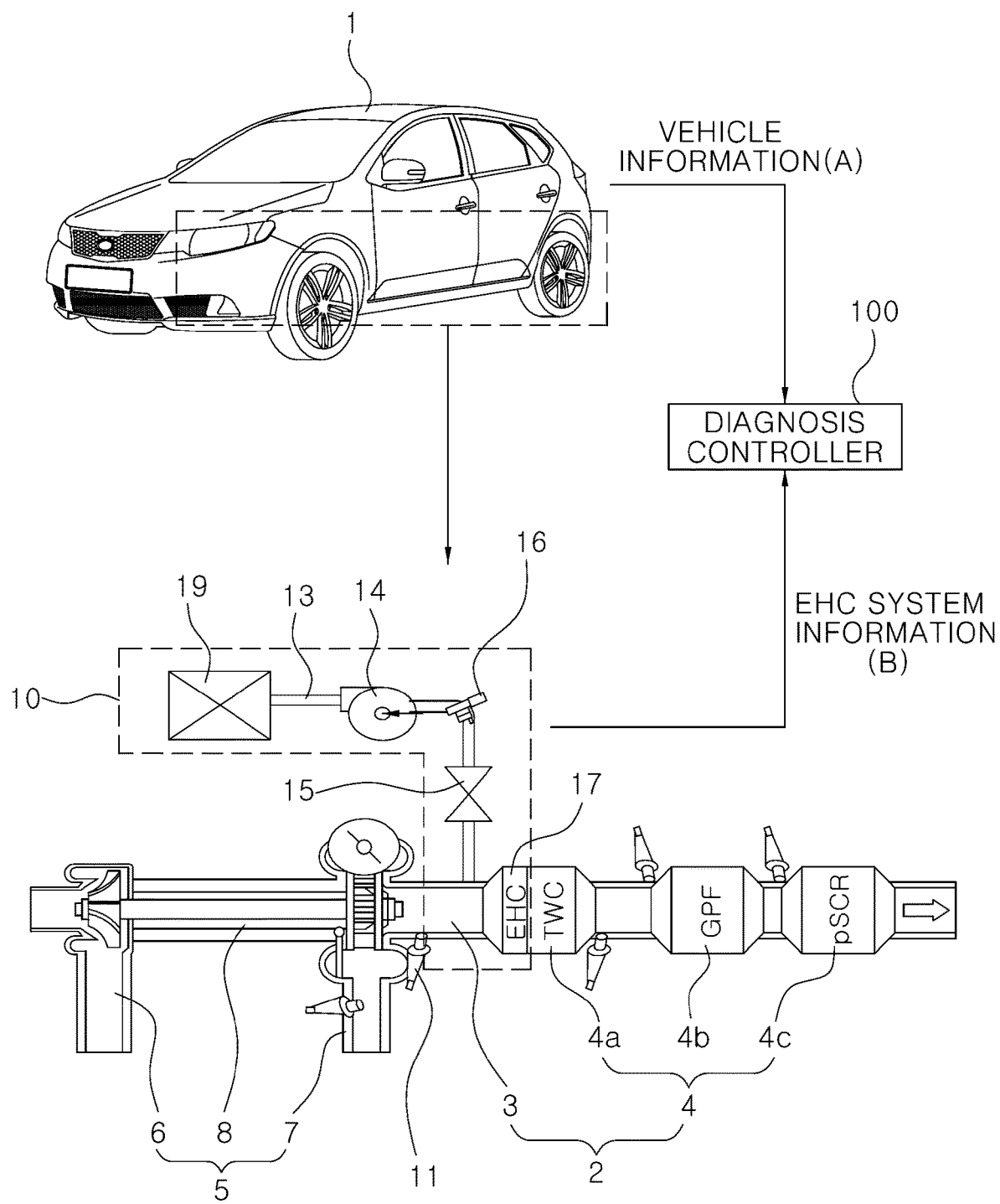
FIG. 2 shows a configuration of a vehicle exhaust system in which an EHC line leakage diagnosis control according to an exemplary embodiment of the present disclosure is performed.
Figure 3:
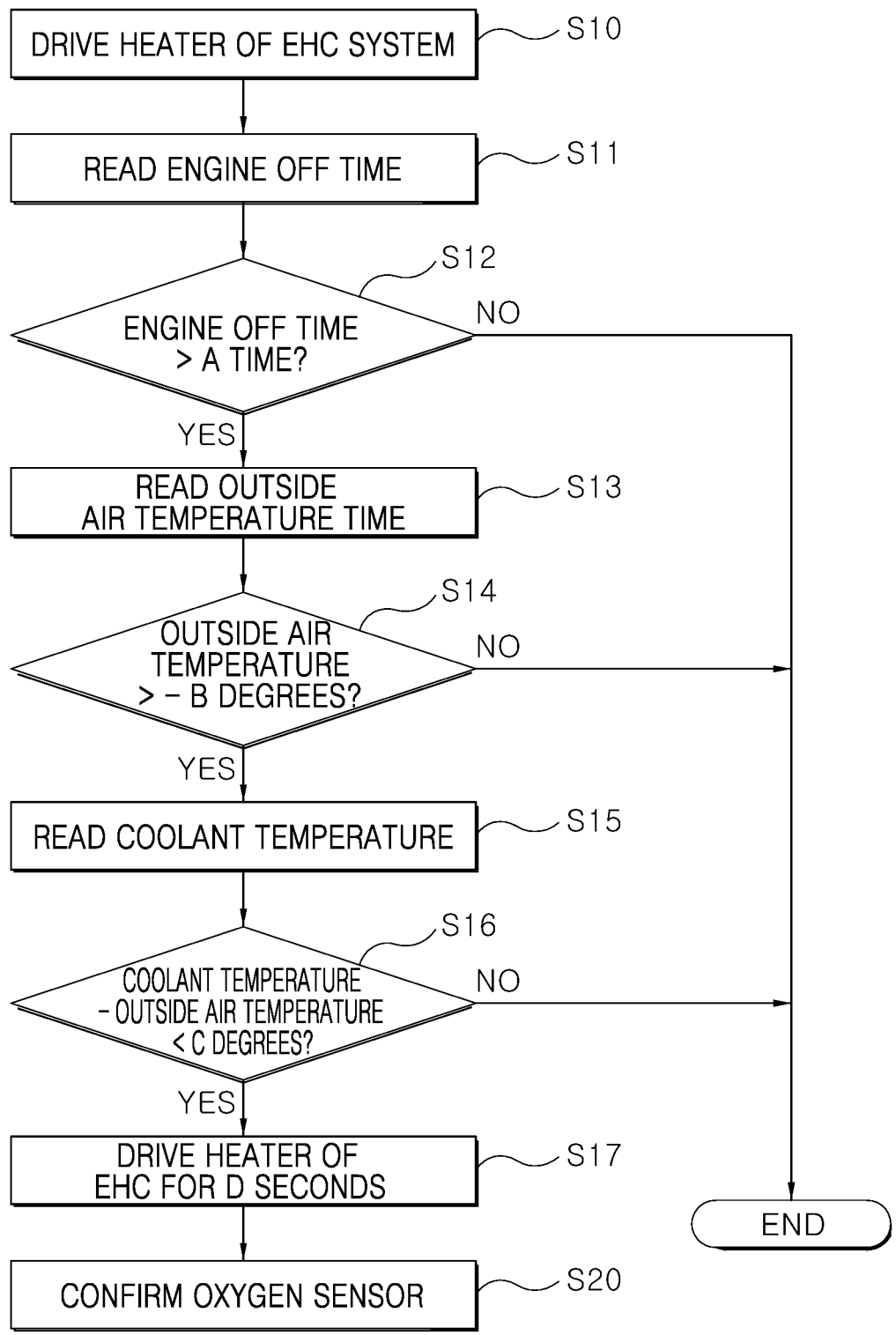
FIG. 3 is a flowchart showing a heater driving control of an EHC system in the EHC line leakage diagnosis method according to an exemplary embodiment of the present disclosure.

Meanwhile, referring to FIG. 2, a vehicle 1 is provided with an electric heated catalyst (EHC) system 10 in an exhaust system 2 connected to an intake system 5 together.

For example, the exhaust system 2 includes an exhaust line 3 through which the exhaust gas flows and a catalyst 4 purifying the exhaust gas, and the intake system 5 includes an intake manifold 6, an exhaust manifold 7, and a variable geometry turbocharger (VGT) 8.

Therefore, the exhaust line 3 is connected to an outlet of the VGT 8 connected to the exhaust manifold 7, and the catalyst 4 includes a three-way catalyst (TWC) 4a, a gasoline particulate filter (GPF) 4b, and a photo selective catalytic reduction (PSCR) 4c, which are sequentially provided on the exhaust line 3. In the instant case, the TWC 4a is configured together with an electric heated catalyst (EHC) 17. Furthermore, a temperature detector for EHC upstream and a temperature detector for EHC downstream of about −40 to 1000° C. are provided on the rear end portion of the TWC 4a, and a temperature detector for GPF downstream of about −40 to 1000° C. is provided on the rear end portion of the GPF 4b.

Furthermore, the VGT 8 is a turbo bypass air amount adjusting device configured for simultaneously obtaining a low-speed torque margin while achieving high torque and high output, and connects between the intake manifold 6 and the exhaust manifold 7. In the instant case, the intake manifold 6 supplies fresh air to the engine, and the exhaust manifold 7 exhausts the exhaust gas an output from the engine to the exhaust line 3 through the rear end portion of the VGT 8.

Therefore, the exhaust system 2 and the intake system 5 are generally devices applied to the vehicle.

For example, the EHC system 10 includes an air pump 14, a switching valve 15, a pressure detector 16, and the electric heated catalyst (EHC) 17, which connect an air cleaner 19 with the exhaust line 3 using an air line 13 and are provided on the air line 13 together with an oxygen detector 11, and controlled by a diagnosis controller 100. In the instant case, the air cleaner 19 purifies the outside air to supply fresh air without foreign substances to the intake manifold 6.

The oxygen detector 11 is a heater-embedded oxygen detector with the heater embedded therein, and provided on the exhaust line 3 connected to the air line 13 and provided on the rear end portion of the switching valve 15 and therefore, positioned on a front end portion of the EHC 17 connected to the exhaust line 3. In the instant case, the heater may be spaced from the oxygen detector 11 or mounted at a position adjacent thereto on the exhaust line 3 as a separate component from the oxygen detector 11.

Therefore, the oxygen detector 11 is used to measure the oxygen concentration in the exhaust gas for activating the catalyst of the exhaust system 2, and furthermore, detects a temperature of a tip portion as a temperature value while detecting a voltage as a signal value using a resistance of the heater, and transmits these signal value (V) and temperature value (° C.) to the diagnosis controller 100.

Furthermore, the air pump 14 is a large-capacity air pump of about 15 kg/h for supplying air to the exhaust line 3 by connecting the air line 13 with the air cleaner 19, and smoothly supplying the air. The switching valve 15 has a solenoid valve type and is provided on the air line 13 on the rear end portion of the air pump 14 to form or block the airflow. The pressure detector 16 is a pressure detector for valve upstream and detects a relative pressure of about 0.5 to 1.0 bar.

Furthermore, the EHC 17 is a catalyst for purifying the exhaust gas, which confirms an EHC temperature using a resistance temperature characteristic curve, and is classified into 4 kW@48v type EHC for a hybrid electric vehicle (HEV) and 4-6 kW@48v type EHC for internal combustion engine (ICE) according to a current and a voltage. In the instant case, the EHC 17 is integrated with the TWC 4a of the exhaust system 2, enhancing an effect of reducing harmful exhaust components during cold start of the vehicle 1.

For example, the diagnosis controller 100 is operated as a central processing unit, which detects the ON/OFF of a starting key, and has a memory including a specific failure diagnosis logic, such as driving the heater of the EHC system (S10)/confirming the oxygen detector (S20)/confirming the leakage of the valve line on the rear end portion of the valve of the EHC system (S30), embedded therein.

Therefore, the diagnosis controller 100 performs the failure diagnosis logic using EHC system information (B) detected by the EHC system 10 together with vehicle information (A) confirmed by the vehicle 1, and outputs its processing result. In the instant case, the vehicle information (A) includes the ON/OFF of the starting key, an engine soaking type, an outside air temperature, an OFF time of the starting key, a throttle detector value, and ON/OFF signals of the air pump 14/the switching valve 15/the oxygen detector heater, and the EHC system information (B) includes the signal value and temperature value of the oxygen detector 11, and a measurement value of the pressure detector 16.

The diagnosis controller 100 controls the switching valve 15 using a PWM output, and generates the airflow in the air line 12 by turning on the switching valve when the air pump 14 is driven, whereas blocking a reverse flow gas (i.e., exhaust gas) to the air line 12 by turning off the switching valve when the air pump 14 is not operated.

Hereinafter, the EHC line leakage diagnosis method will be described in detail with reference to FIG. 2, FIG. 3, FIG. 4, FIG. 5, FIG. 6, FIG. 7, and FIG. 8. In the instant case, the control subject is the diagnosis controller 100, and the control object is one or more of the oxygen detector heater 11, the air pump 14, and the switching valve 15 of the EHC system 10.

First, the diagnosis controller 100 performs the driving of the heater of the EHC system (S10) with confirming an engine OFF time (S11, S12), confirming an outside air temperature (S13, S14), confirming a coolant temperature (S15, S16), and operating the heater of the EHC system (S17). In the instant case, the environmental standard when the emission material (EM) of the exhaust gas is measured is generally applied to the standard of the engine OFF time and the outside air temperature.

Referring to the EHC system 10 of FIG. 2, the diagnosis controller 100 confirms whether to satisfy erroneous diagnosis prevention conditions while controlling the EHC system 10 using the non-operation of the air pump 14 and the OFF of the switching valve 15 and then supplies a power source to the heater of the oxygen detector 11. In the instant case, the power source may be supplied from a battery mounted on the vehicle 1.

Figure 6:
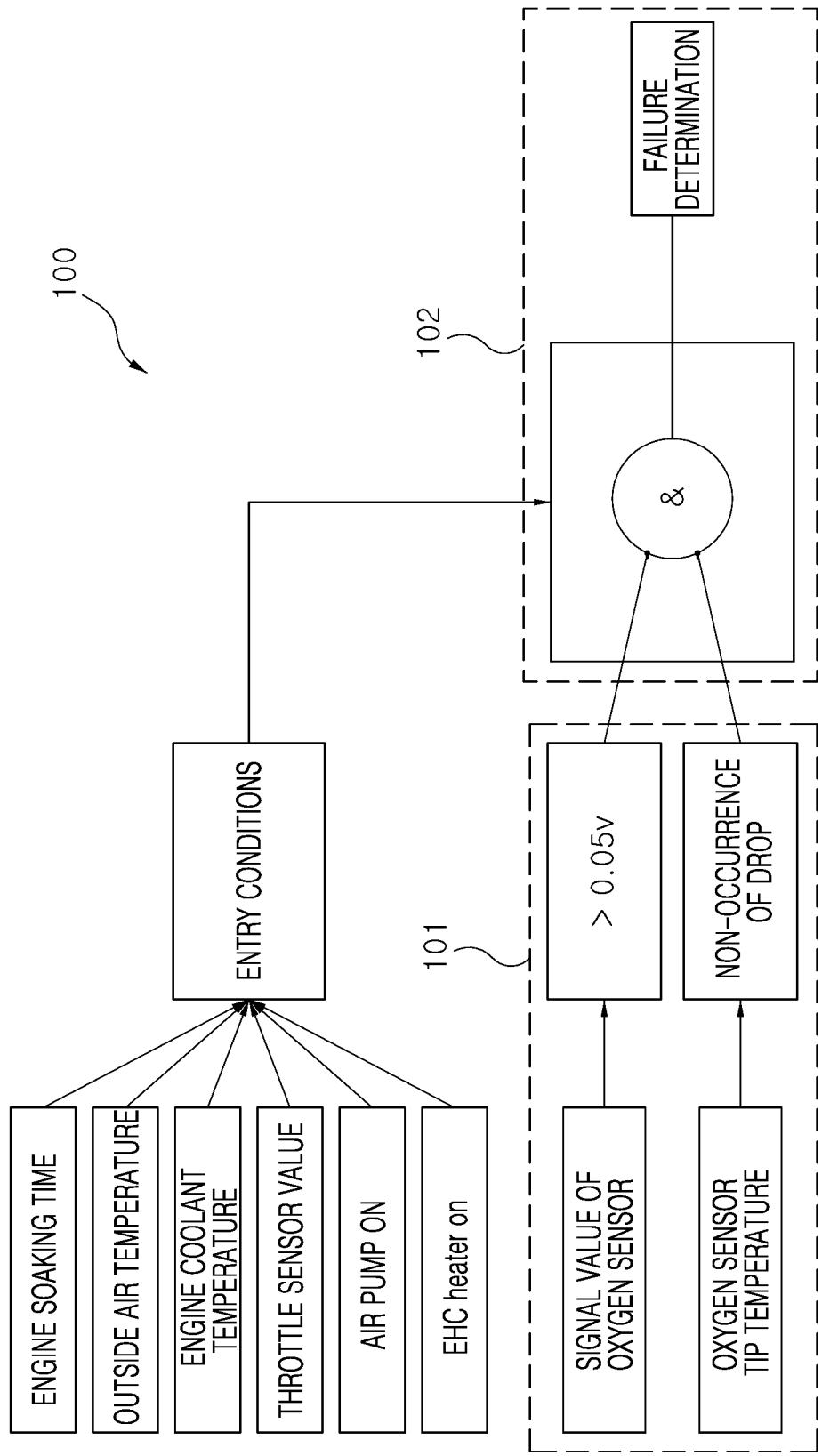
FIG. 6 shows an operating state of the vehicle exhaust system during the EHC line leakage diagnosis control according to an exemplary embodiment of the present disclosure.

Referring to FIG. 6, a failure determination portion 102 of the diagnosis controller 100 confirms, as entry conditions, an engine soaking time, an outside air temperature, an engine coolant temperature, a throttle detector value, an EHC heater on, and an air pump on, and therefore, outputs an EHC heater ON signal when the conditions of the engine soaking time, the outside air temperature, and the engine coolant temperature are established. In the instant case, the engine OFF time may be set as about 6 hours or more, the outside air temperature may be set within about 10° C., and a temperature difference between the coolant temperature and the outside air temperature (coolant temperature−outside air temperature) may be set as less than about 15° C. Furthermore, the soaking in the engine soaking state means that fresh air is not supplied to the engine like the engine off (i.e., after the engine is turned off), and the soaking state or time of the engine is a parking state or a parking time.

The reason why the throttle detector value is not used is that the failure diagnosis is performed in the non-operation state of the engine upon the key-on of the vehicle, becoming the state where the fuel is not supplied. Furthermore, this is because the air pump 14 is operated after the heater is operated.

For example, the confirming of the engine OFF time (S11, S12) confirms whether the read engine OFF time (S11) is 6H (Hour) or more based on a set time (A) (S12), the confirming of the outside air temperature (S13, S14) confirms whether the outside air temperature value read in a state where the time at which the vehicle is placed at the outside air temperature (i.e., external state) lapses (S13) is less than −10° C. based on a set temperature (B) (S14), and the confirming of the coolant temperature (S15, S16) confirms whether the read coolant temperature value (S15) is less than +15° C. based on a temperature difference value (C) between the coolant temperature and the outside air temperature obtained by subtracting the coolant temperature value from an outside air temperature value (S16).

As described above, the failure determination portion 102 can confirm a case where the engine OFF time is less than 6 hours (H), the outside air temperature is less than −10° C., or the difference between the coolant temperature and the outside air temperature is +15° C. or more. Accordingly, the diagnosis controller 100 terminates the control by determining the above as a case where the entry conditions are not established.

On the other hand, the failure determination portion 102 can confirm a case where the outside air temperature is −10° C. or more and the difference between the coolant temperature and the outside air temperature is less than +15° C. in a state where the engine OFF time is 6 hours (H) or more. Accordingly, the diagnosis controller 100 operates the EHC heater by determining the above as a case where the entry conditions are established.

Figure 7:
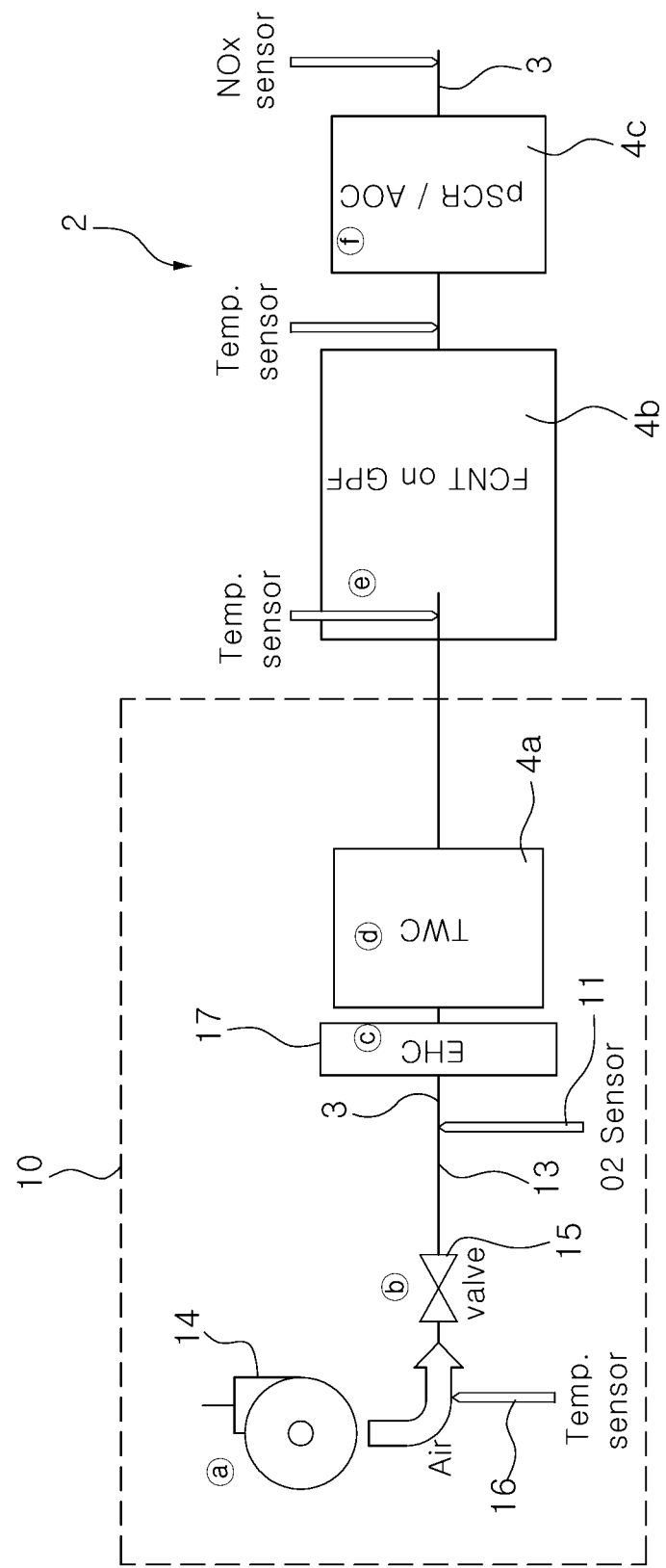
FIG. 7 shows an operating state of a configuration unit applied to a diagnosis controller of the vehicle exhaust system according to an exemplary embodiment of the present disclosure.

Referring to the operation of the EHC system 10 of FIG. 7, the diagnosis controller 100 supplies a power source to the heater of the oxygen detector 11 to perform the operating of the EHC heater (S17).

For example, the diagnosis controller 100 performs the operating of the EHC heater (S17) by maintaining the power supply for about 20 seconds.

Accordingly, the diagnosis controller 100 enters confirming the oxygen detector (S20).

Figure 4:
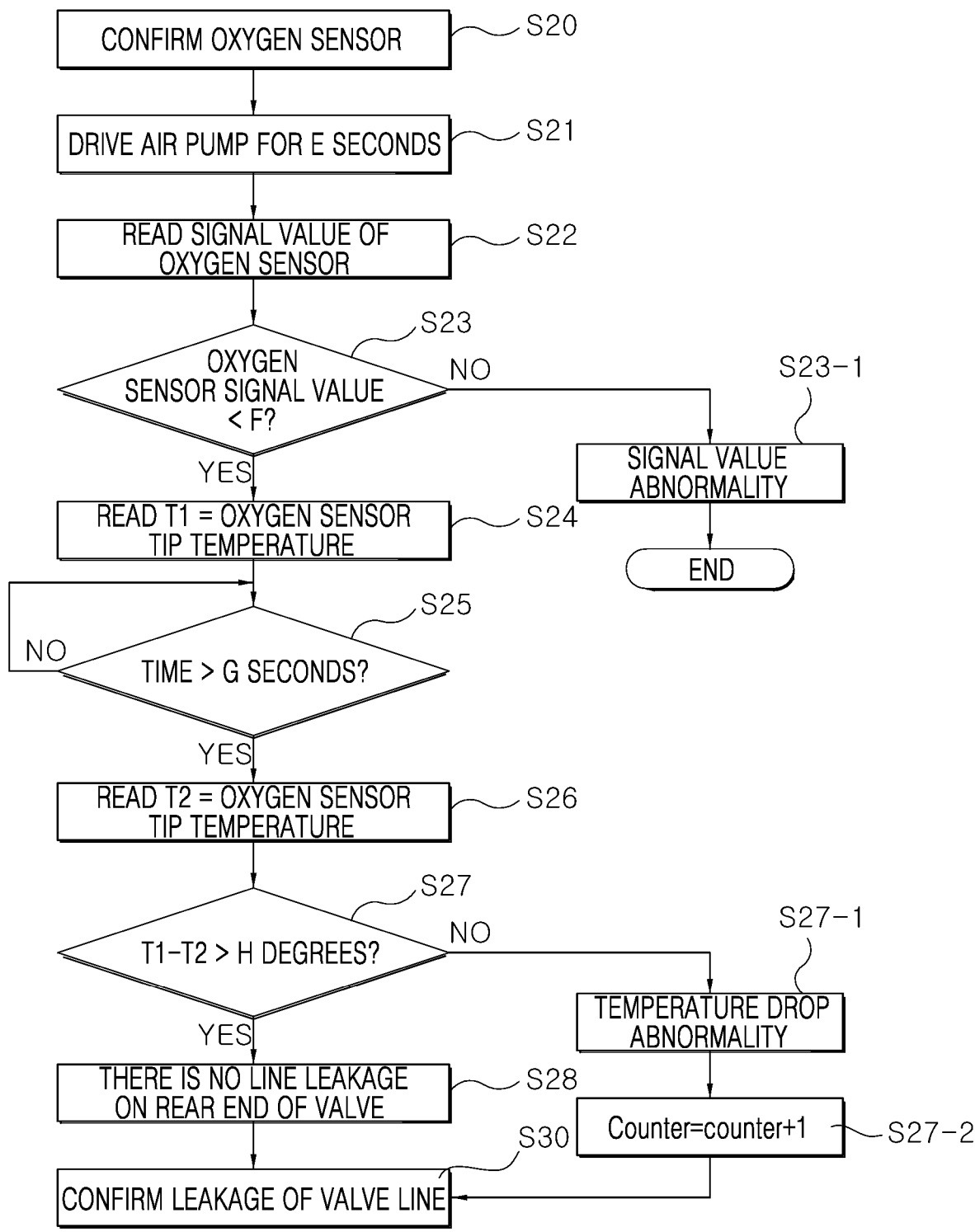
FIG. 4 is a flowchart showing an oxygen detector confirmation control in the EHC line leakage diagnosis method according to an exemplary embodiment of the present disclosure.

Referring to FIG. 4, the diagnosis controller 100 performs the confirming of the oxygen detector (S20) with driving the air pump (S21), confirming the signal value of the oxygen detector (S22, S23), confirming the temperature value of the oxygen detector (S24 to S27), and confirming there is no line leakage on the rear end portion of the valve (S28).

Referring to the operation of the EHC system 10 of FIG. 6, the failure determination portion 102 of the diagnosis controller 100 opens the switching valve 15 using a valve on signal while driving the air pump 14 using a pump ON signal confirmed from the entry conditions to communicate the air line 13 with the exhaust line 3.

Accordingly, the air output from the air cleaner 19 through the pump 14 is supplied to the exhaust line 3 through the air line 13, and the air flowing into the exhaust line 3 is heated by the oxygen detector heater to be output to the exhaust line 3 through the EHC 17, TWC 4a, GPF 4b, and PSCR 4c.

In other words, the air flows into the air line 13 and the exhaust line 3 through ⓐ [the air pump 14]→ ⓑ [the switching valve 15]→ ⓒ [the EHC 17]→ ⓓ [TWC 4a]→ ⓔ [GPF 4b]→[PSCR 4c]. In the instant case, "→" means the order of the airflow.

For example, the driving of the air pump (S21) drives the air pump 14 for E seconds to supply the air and then, the confirming of the signal value of the oxygen detector (S22, S23) and the confirming of the temperature value of the oxygen detector (S24 to S27) are performed. In the instant case, as the E second, about 1 second is applied.

The failure determination portion 102 confirms the signal value of the oxygen detector and the temperature value of the oxygen detector confirmed by a line leakage diagnosis portion 101 while confirming the air pump on among the entry conditions.

Referring to FIG. 8, the oxygen detector 11 indicates a detection region of the signal value of the oxygen detector and a measurement region of the temperature value of the oxygen detector according to an operation interval (about 1 second) of the air pump 14. In the instant case, the signal value of the oxygen detector is generated as a value of 0.05 V or less compared to the initial value of 0.45 V, and this is because the lambda index is in the lean state (i.e., oxygen excess state) as only the air by the air pump without exhaust gas is supplied to the exhaust line.

For example, it may be seen that the initial value of 0.45 V is reduced to the detection value of 0.05 V by setting the initial value of the signal value of the oxygen detector as 0.45 V in the detection region of 0.05 V to 0.45 V to operate the air pump 14, and it may be seen that the temperature value of the oxygen detector (i.e., oxygen detector tip temperature) tends to increase with an initial temperature value slightly changed according to the operating situation of the air pump while the signal value of the oxygen detector decreases from 0.45 V to 0.05 V. In the instant case, a pre-operation of the air pump is indicated by T1 (i.e., a first oxygen detector tip temperature (T1)), and a post-operation of the air pump is indicated by T2 (i.e., a second oxygen detector tip temperature (T2)).

The confirming of the signal value of the oxygen detector (S22, S23) and the confirming of the temperature value of the oxygen detector (S24 to S27) will be described in detail by use of the aforementioned characteristics of the oxygen detector as follows.

For example, the confirming of the signal value of the oxygen detector (S22, S23) confirms whether the read signal value of the oxygen detector (S22) is less than 0.05 V based on a set signal value (F) (S23).

As a result, when the signal value of the oxygen detector is 0.05 V or more (S23), the diagnosis controller 100 determines it as a signal value abnormality to terminate the control, and on the other hand, enters the confirming of the temperature value of the oxygen detector (S24 to S27) when the signal value of the oxygen detector is less than 0.05 V.

For example, the confirming of the temperature value of the oxygen detector (S24 to S27) includes reading the first oxygen detector tip temperature (T1) (S24), a time lapse step (S25), reading the second oxygen detector tip temperature (T2) (S26), and determining a tip portion temperature difference (S27). In the instant case, the time lapse step (S25) is confirmed by setting a time set value (G) as about 1 second.

Therefore, the determining of the tip temperature difference (S27) is performed by comparing a tip portion temperature difference (T1−T2) obtained by subtracting the second oxygen detector tip temperature (T2) from the first oxygen detector tip temperature (T1) with 10° C. which is a tip portion temperature difference set value (H). In the instant case, the tip portion temperature difference (T1−T2) is applied as an absolute value.

Therefore, when the tip temperature difference (T1−T2) is 10° C. or more which is the tip temperature difference set value (H), it is the temperature drop which is the normal state, and therefore, the diagnosis controller 100 switches the state where there is no leakage on the line of the rear end portion of the valve (S28) to the confirming of the leakage of the valve line (S30).

On the other hand, when the tip temperature difference (T1−T2) is less than 10° C. which is the tip temperature difference set value (H), it is the temperature drop which is the abnormal state, and therefore, the diagnosis controller 100 sets a temperature abnormality counter as 1 (e.g., counter=counter+1) (S27-2) and then switches the step to the confirming of the leakage of the valve line (S30).

Finally, the diagnosis controller 100 enters the confirming of the leakage of the valve line (S30).

Figure 5:
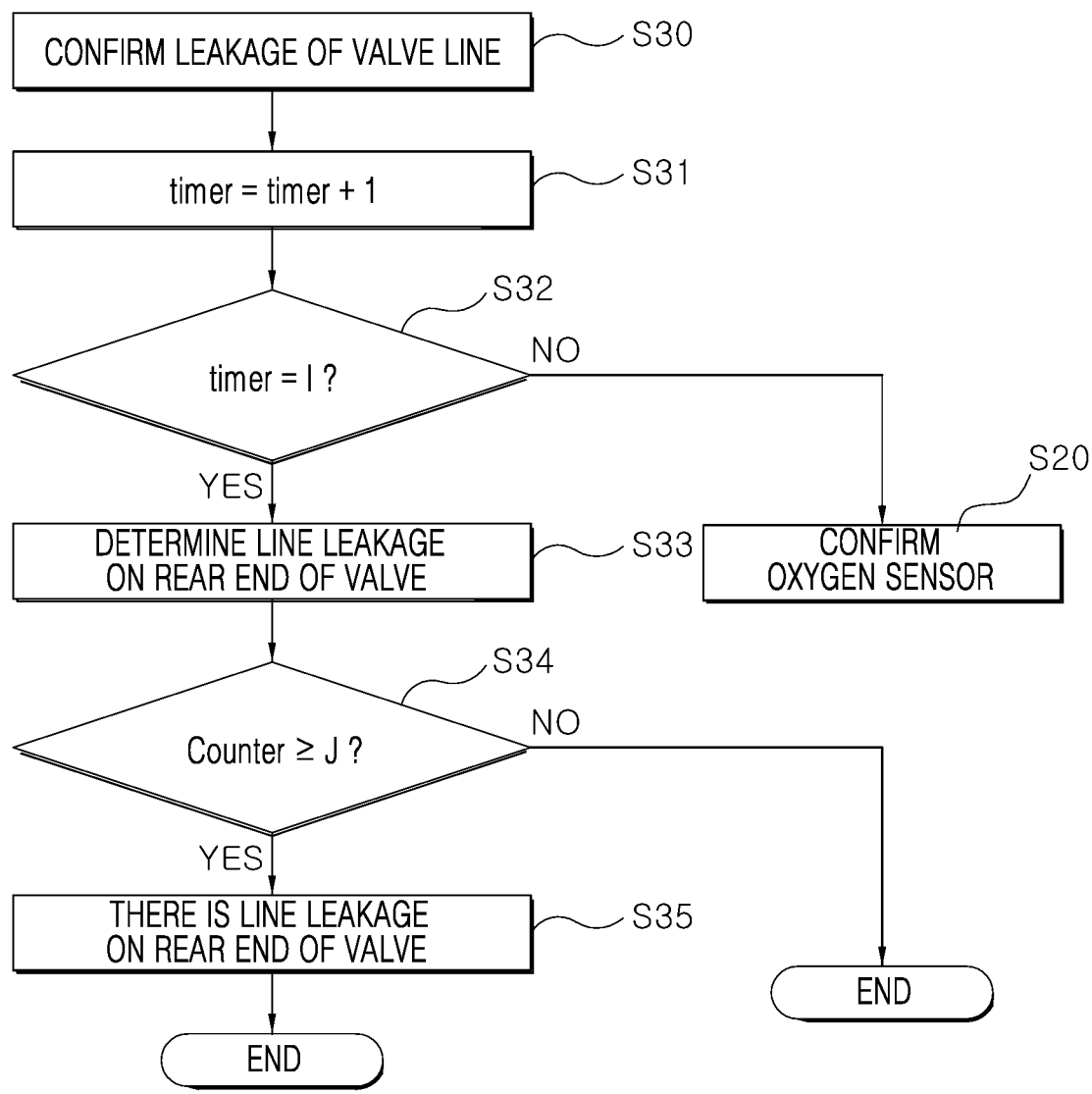
FIG. 5 is a flowchart showing a valve line leakage confirmation control in the EHC line leakage diagnosis method according to an exemplary embodiment of the present disclosure.

Referring to FIG. 5, the diagnosis controller 100 performs the confirming of the leakage of the valve line (S30) with applying a timer (S31, S32) and verifying the line leakage (S33 to S35).

Referring to FIG. 7, the failure determination portion 102 of the diagnosis controller 100 collects the results of the line leakage diagnosis portion 101 under the entry conditions to perform determining the line leakage on the rear end portion of the valve using the failure determination logic (S33).

Therefore, the diagnosis controller 100 continuously confirms the air pump ON signal and the signals of the signal value and temperature value of the oxygen detector of the line leakage diagnosis portion 101 among the entry conditions in the failure determination unit 102.

For example, the applying of the timer (S31, S32) performs setting the timer (S31) followed by confirming the timer (S32).

To the present end, the setting of the timer (S31) increases the count from 1 timer count (e.g., timer=timer+1), and the confirming of the timer (S32) is performed by setting a time count set value (I) as about 3 counts.

As a result, when the time count set value (I) is less than 3 counts, the diagnosis controller 100 feedbacks the step to the confirming of the oxygen detector (S20) to repeatedly perform the steps (S21 to S28). Therefore, as a result of performing the steps (S21 to S28) again, when the tip temperature difference is the temperature drop or more (S27-1) in the determining of the tip temperature difference (S27), the diagnosis controller 100 sets the temperature abnormality counter as 2 (e.g., counter=counter+1) (S27-2) and then enters the confirming of the leakage of the valve line (S30) again. In the instant case, the temperature abnormality count number (S27-2) is set according to confirming the number of counters (S34), and sets its maximum value as 3 or more.

On the other hand, the diagnosis controller 100 enters the verifying of the line leakage (S33 to S35) when the time count set value (I) is 3 counts.

For example, the verifying of the line leakage (S33 to S35) includes determining whether there is the line leakage on the rear end portion of the valve (S33), confirming the number of temperature abnormality counts (S34), and determining that there is the line leakage on the rear end portion of the valve (S35).

Therefore, the verifying of the line leakage (S33 to S35) applies, as a condition, that the time count set value (I) reaches 3 counts, and therefore, applies only the confirming of the number of temperature abnormality counts (S34) to the determining of that there is the line leakage on the rear end portion of the valve (S35).

To the present end, the confirming of the number of temperature abnormality counters (S34) is performed by setting the counter, which is the number of repeated times of the temperature drop abnormality caused based on the temperature value detected by the tip portion of the oxygen detector 11, based on a temperature abnormality counter set value (J). In the instant case, the temperature abnormality counter set value (J) are applied as 3 counts.

As a result, when the temperature drop abnormality continuously occurs for 3 counts or more, which are the temperature abnormality set value (J), the diagnosis controller 100 determines that there is the line leakage on the rear end portion of the valve (S35) and then terminates performing the EHC line leakage diagnosis control.

Therefore, the diagnosis controller 100 confirms the leakage of the valve line on the rear end portion of the switching valve 3 in the EHC system 10 to determine it as the system failure.

On the other hand, the diagnosis controller 100 terminates the confirming of the leakage of the valve line (S30) when the temperature drop abnormality does not continue even at 3 counts or more, which are the temperature abnormality counter set value (J).

Therefore, the diagnosis controller 100 confirms that there is no line leakage on the rear end portion of the valve (S28), and determines it as the system normality without the leakage of the valve line on the rear end portion of the switching valve 3 in the EHC system 10.

Thereafter, since the EHC system 10 is normal, the diagnosis controller 100 drives the air pump 14 for about 12 seconds so that the signal value and temperature value of the oxygen detector 11 affected by the heating of the heater return to the initial values and accordingly, additionally drives the air pump 14 for about 12 seconds when the engine is not started in the key-on state (S10).

As described above, when the heater of the electric heated catalyst (EHC) system 10 is driven after the satisfaction of the temperature conditions of the engine coolant temperature and the outside air temperature is confirmed by the diagnosis controller 100 confirming the entry conditions upon key-on of the vehicle, the EHC line leakage diagnosis method applied to the vehicle exhaust system 2 according to the exemplary embodiment of the present disclosure can confirm the change in temperature of the temperature value of the oxygen detector 11 detected after the airflow of the exhaust line 3 by driving the air pump 14 as the occurrence of the temperature drop according to the time lapse and confirm the line leakage on the rear end portion of the switching valve 15 using the number of counts of the occurrence of the temperature drop, performing the failure diagnosis of the EHC system 100, and can perform the failure diagnosis without generating the exhaust gas by not operating the engine, eliminating the difficulty in mounting the pressure detector exposed to the high-temperature exhaust gas and not applying the pressure detector.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by multiple control devices, or an integrated single control device.

In various exemplary embodiments of the present disclosure, the control device may be implemented in a form of hardware or software, or may be implemented in a combination of hardware and software.

Furthermore, the terms such as "unit", "module", etc. Included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

Furthermore, the term of "fixedly connected" signifies that fixedly connected members always rotate at a same speed. Furthermore, the term of "selectively connectable" signifies "selectively connectable members rotate separately when the selectively connectable members are not engaged to each other, rotate at a same speed when the selectively connectable members are engaged to each other, and are stationary when at least one of the selectively connectable members is a stationary member and remaining selectively connectable members are engaged to the stationary member".

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An electric heated catalyst (EHC) line leakage diagnosis method, the method comprising:
   driving, by a diagnosis controller, a heater of an EHC system after entry conditions according to an engine state upon key-on of a vehicle are confirmed;
   determining, by the diagnosis controller, a change in temperature using a signal value and a temperature value of an oxygen detector in an exhaust line after an air pump is driven, and confirming, by the diagnosis controller, an occurrence of a temperature drop according to a time lapse; and
   confirming, by the diagnosis controller, a line leakage on a rear end portion of a valve using a number of counts of the occurrence of the temperature drop.

2. The method of claim 1, wherein the key-on is an engine non-operation state where an exhaust gas is not generated.

3. The method of claim 1, wherein the heater is provided in the oxygen detector.

4. The method of claim 1, wherein the oxygen detector is provided on the exhaust line.

5. The method of claim 1, wherein as the entry conditions, one or more signals of an engine soaking, an outside air temperature, an engine coolant temperature, a throttle detector value, a heater ON, and an air pump ON are applied.

6. The method of claim 5, wherein the driving of the heater is determined by an engine OFF time of the engine soaking and temperature conditions of the outside air temperature and the engine coolant temperature.

7. The method of claim 6, wherein the heater is driven for 20 seconds.

8. The method of claim 1,
   wherein the driving of the air pump includes flowing air into the exhaust line,
   wherein the signal value of the oxygen detector confirms a lambda index as a lean state, and the temperature value of the oxygen detector is measured as a first oxygen detector tip temperature and a second oxygen detector tip temperature and applied to the change in the temperature, and
   wherein the time lapse is a measurement time that confirms a tip temperature difference between the first oxygen detector tip temperature and the second oxygen detector tip temperature, and the occurrence of the temperature drop is confirmed by the tip temperature difference.

9. The method of claim 8, wherein the air pump is driven for 1 second.

10. The method of claim 8, wherein as the signal value, 0.05 V is applied by setting 0.45 V as a set signal value.

11. The method of claim 8, wherein the diagnosis controller is configured to determine whether the occurrence of the temperature drop is normal or abnormal according to the tip temperature difference based on 10° C.

12. The method of claim 11, wherein the tip temperature difference is an absolute value obtained by subtracting the second oxygen detector tip temperature from the first oxygen detector tip temperature.

13. The method of claim 8, wherein as the time lapse, 1 second is applied.

14. The method of claim 8, wherein when the diagnosis controller confirms that abnormality of the occurrence of the temperature drop occurs by use of the tip temperature difference,
   a temperature abnormality counter of the oxygen detector is set as 1 and is summed to a number of counters according to occurrence of the abnormality of the occurrence of the temperature drop, and
   the number of counters is a number of times of the air pump driven.

15. The method of claim 14, wherein a cumulative number of counters is set as 3 or more than 3.

16. The method of claim 1,
   wherein the diagnosis controller is configured to confirm the line leakage on the rear end portion of the valve by occurrence of a number of times of occurrence of the temperature drop which is equal to or greater than a number of counts of a temperature abnormality counter set value in a state where a time count set value of the occurrence of the temperature drop is satisfied, and
   wherein the diagnosis controller is configured to confirm the line leakage on the rear end portion of the valve by the number of counts.

17. The method of claim 16,
   wherein the temperature abnormality counter set value is a value in which the temperature drop occurs three times, and
   wherein the number of counts of the temperature abnormality counter set is a number of times of the air pump driven.

18. A vehicle exhaust system comprising:
   an exhaust line through which an exhaust gas flows;
   an electric heated catalyst (EHC) system including an oxygen detector provided on the exhaust line, an air pump configured to transmit air to an air line connected to the exhaust line, a switching valve configured to open a passage of the air line, a pressure detector configured to detect a pressure on a valve front end portion of the switching valve, and an electric heated catalyst (EHC) purifying the exhaust gas; and
   a diagnosis controller configured to confirm satisfaction of temperature conditions of an engine coolant temperature and an outside air temperature under entry conditions according to a key-on and then, confirm occurrence of a temperature drop according to a time lapse depending upon a change in a temperature value of the oxygen detector detected after airflow of the exhaust line by driving the air pump when a heater of the EHC system is driven, and to confirm a line leakage on a rear end portion of the switching valve using a number of counts of the occurrence of the temperature drop.

19. The vehicle exhaust system of claim 18, wherein the heater is embedded in the oxygen detector.

20. The vehicle exhaust system of claim 18, wherein the EHC is configured integrally with a three-way catalyst (TWC).

* * * * *